United States Patent [19]

Lange et al.

[11] Patent Number: 4,745,231
[45] Date of Patent: May 17, 1988

[54] ALKYLENE OXIDE BLOCK POLYMERS USABLE AS DEFOAMERS

[75] Inventors: Fritz Lange, Essen; Rainer Hoefer, Duesseldorf; Karl-Heinz Schmid, Mettmann; Adolf Asbeck, Duesseldorf; Klaus Herrmann, Monheim, all of Fed. Rep. of Germany

[73] Assignee: Henkel Kommanditgesellschaft auf Aktien, Duesseldorf, Fed. Rep. of Germany

[21] Appl. No.: 893,756

[22] Filed: Aug. 6, 1986

[30] Foreign Application Priority Data

Aug. 31, 1985 [DE] Fed. Rep. of Germany ....... 3531212

[51] Int. Cl.$^4$ .............................................. C07C 43/11
[52] U.S. Cl. .................................. 568/624; 568/606; 568/620; 252/321; 528/421
[58] Field of Search .................... 568/620, 624, 606; 528/417, 425, 405, 421; 252/321

[56] References Cited

U.S. PATENT DOCUMENTS

| | | | |
|---|---|---|---|
| 3,078,236 | 2/1963 | Hwa | 252/321 |
| 3,408,300 | 10/1968 | Schuessler et al. | 252/156 |
| 3,491,029 | 1/1970 | Kasperl et al. | 252/156 |
| 4,151,269 | 4/1979 | Torii et al. | 568/620 |
| 4,183,821 | 1/1980 | Langdon | 568/624 |
| 4,260,504 | 4/1981 | Tucoulat et al. | 568/624 |
| 4,510,067 | 4/1985 | Ozmeral | 252/174.21 |
| 4,649,224 | 11/1987 | Panek | 568/624 |

FOREIGN PATENT DOCUMENTS

| | | | |
|---|---|---|---|
| 0018482 | 11/1980 | European Pat. Off. | 568/620 |
| 0055818 | 7/1982 | European Pat. Off. | 560/620 |
| 2360020 | 12/1975 | Fed. Rep. of Germany | 560/620 |
| 2204683 | 10/1973 | France | 560/620 |
| 699664 | 11/1953 | United Kingdom | 568/620 |

OTHER PUBLICATIONS 8611692, 2-1987, European Search Report.

*Primary Examiner*—Werren B. Lone
*Attorney, Agent, or Firm*—Ernest G. Szoke; Henry E. Millson, Jr.; Real J. Grandmaison

[57] ABSTRACT

Block polymers usable as defoamers have the following formula $$[R]_x \diagup \diagdown \begin{array}{l} [(CH_2-CH_2-O)_a-(CH_2-CH-O)_b-(CH_2-CH_2O)_c]_y-H \\ \qquad\qquad\qquad\qquad\qquad\quad | \\ \qquad\qquad\qquad\qquad\qquad\, CH_3 \\ [(CH_2-CH-O)_d-(CH_2-CH_2-O)_e]_z-H \\ \quad\;\; | \\ \quad\; CH_3 \end{array}$$

in which R represents a glycerol or polyglycerol function having a degree of polymerization x of from 1 to 6 and the indices y is equal to (x−z+2), z is equal to (x−y+2), a is equal to 1 to 15, b is equal to 50 to 200 c is equal to 1 to 15, d is equal to 20 to 150 and e is equal to 1 to 15, with the proviso that the sums (a+c+e) is equal to 2 to 20, (b+d) is equal to 50 to 250 and (c+e) is equal to 1 to 15, and y has a value of at least 1.

The block polymers are prepared by reaction of glycerol or polyglycerol having a degree of polymerization x with ethylene oxide, then with propylene oxide and, finally, again with ethylene oxide, preferably in the presence of alkaline etherification catalysts.

14 Claims, No Drawings

ALKYLENE OXIDE BLOCK POLYMERS USABLE AS DEFOAMERS

BACKGROUND OF THE INVENTION

1. Field of the Invention

This invention relates to novel defoamers, i.e., defoaming or antifoaming agents, for use where foam control is desired, and more particularly, to such defoamers comprising alkylene oxide block polymers.

2. Description of Related Art

In general, polypropylene oxide adducts with glycerol and polyglycerol are known. According to German application Nos. 12 61 618; 12 80 455; and 23 60 020, and U.S. Pat. No. 3,078,236, they may be employed as defoamers in solutions of detergents and cleaning preparations. However, prior art defoamers either do not bring about the spontaneous collapse of foam, or their foam-inhibiting effect soon weakens or is lost and foam builds up again after a short period of time. Other defoamers may provide long-lasting foam inhibition, but initially inhibit the foam very slowly. Thus, it would be desirable to obtain a foam inhibitor which would inhibit foam spontaneously and also retain the property of long-lasting foam inhibition. It has now been found that an alkylene oxide block polymer of the aforementioned class of compounds provides the desired foam-inhibiting properties.

SUMMARY OF THE INVENTION

The present invention relates to a block polymer corresponding to the following formula:

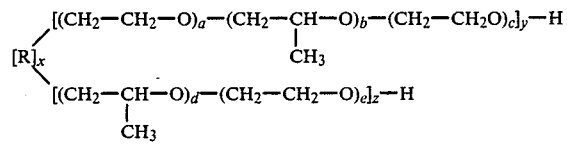

in which R represents a glycerol or polyglycerol function having a degree of polymerization x of from 1 to 6 and the indices y is equal to $(x-z+2)$, z is to $(x-y+2)$, a is equal to 1 to 15, b is equal to 50 to 250, c is equal to 1 to 15, d is equal to 50 to 250 and e is equal to 1 to 15, with the proviso that the sums $(a+c+e)$ is equal 2 to 20, $(b+d)$ is equal to 50 to 250 and $(c+e)$ is equal to 1 to 15, and y has a value of at least 1.

DETAILED DESCRIPTION OF THE INVENTION

It has now been found that alkylene oxide block polymers of glycerol and polyglycerol provide superior defoaming properties.

Other than in the operating examples, or where otherwise indicated, all numbers expressing quantities of ingredients or reaction conditions used herein are to be understood as modified in all instances by the term "about".

Preferred block polymers are those in which the indices y is equal to at least 2, a is equal to 2 to 10, b and d is equal to 80 to 200, and c and e is equal to 2 to 10, and the sum of $a+c+e$ is equal to 3 to 15. Particularly preferred block polymers are those in which R represents a glycerol function, i.e., in which x is equal to 1. In these block polymers derived from glycerol, 2 to 3 hydroxyl groups are generally substituted by ethylene glycolether groups, i.e., y is equal to 2 or 3, and z is equal to 0 or 1.

The production of the block polymers is carried out by methods known per se, preferably under pressure and at elevated temperature, for example at 80° to 200° C., preferably at 100° to 180° C., in the presence of acidic or alkaline catalysts. Acidic catalysts may be, for example, LEWIS acids, such as boron trifluoride or aluminum chloride. Preferred catalysts are alkaline catalysts, such as the alcoholates, hydroxides, oxides, carbonates, hydrides or amides of alkali metal or alkaline-earth metals. Particularly preferred catalysts are the alcoholates, for example, the methylates or ethylates and the hydroxides of sodium or potassium. The catalysts are generally used in quantities of from 0.05 to 3% by weight, and preferably in quantities of from 0.1 to 1% by weight, based on the end product. On completion of the reaction, the catalyst may be inactivated by neutralization and the salt formed may be mechanically removed. In cases where its presence causes no problems, it may even remain in the product, which in general is completely safe in view of the small quantities in which the block polymer is used as a foam inhibitor.

The starting material used is, in particular, glycerol and mixtures thereof with polyglycerols. The polyglycerols accumulating, for example as distillation residues, in the commercial production of glycerol which generally have an average degree of polymerization of from 2 to 6 may be used as starting material, optionally after mixing with various quantities of monomeric glycerol. However, glycerol is preferably used as the starting material. Technical grade glycerols, in particular discolored starting materials, are best treated beforehand with chemical or adsorptive bleaches and are dehydrated before the reaction, for example, by heating in vacuo.

After addition of the catalyst, the starting material is reacted while stirring in a first step with from 1 to 15 moles, and preferably with from 2 to 10 moles, of ethylene oxide. After the pressure in the autoclave has fallen, which generally takes from 0.5 to 1.5 hours and indicates the end of the reaction, from 50 to 250 moles and preferably from 80 to 200 moles of propylene oxide are introduced under pressure with continued stirring. On completion of the second reaction step, indicated by a fall in pressure, the reaction is continued accordingly with from 1 to 15 moles, and preferably with from 2 to 10 moles, of ethylene oxide. The total quantity of ethylene oxide used in the 1st and 3rd steps amounts to between 2 and 20 moles, and preferably to between 3 and 15 moles. Since the quantity of reaction product multiplies from step to step, particularly in the 2nd step, the reaction is best divided up several times.

The composition of the block polymers in regard to the ratio of the two indices y and z to one another depends to a certain extent upon the number (a) of ethylene oxide groups. Ethylene oxide is known to react preferentially with primary hydroxyl groups. In the first step, therefore, it is predominantly the two primary hydroxyl groups of the glycerol or polyglycerol which react with ethylene oxide; thereafter, the intermediately formed ethylene glycolethers preferentially react with ethylene oxide. The reaction with propylene oxide is accompanied by the formation of secondary hydroxyl groups, so that shortly after the beginning of the propoxylation step both the hydroxyl groups of the alkoxylation product being formed and also the hitherto unreacted hydroxyl groups of the starting material may be propoxylated to the same extent. It follows from this that small amounts of ethylene oxide in the first step, for example where a=1 to 3, lead to comparatively higher values of z whilst, on the other hand, the value of z decreases with increasing value of a.

The block polymers are colorless to faintly colored liquids having a viscosity which substantially corresponds to that of the glycerol. They may be used either directly or after dispersion in water or dissolution in organic solvents, such as for example, low molecular weight alcohols. They may be mixed with diluents, dispersants or other foam-inhibiting compounds and used in that form. Examples of compounds such as these are polyglycolether derivatives of alcohols or fatty acids, fatty acid esters and paraffins or paraffin oils. The block polymers may also be applied to carrier grains consisting of an absorbent material and used in that form, for example as pourable and free-flowing adsorbates. Suitable carrier materials include, for example, loose, more especially spray-dried salts, such as sulfates, carbonates, phosphates, polyphosphates, silicates and borates of sodium or magnesium, finely divided silicon dioxide (kieselguhr, Aerosil ®) or aluminum oxide, and finely-divided clays, bentonites and aluminosilicates, and also mixtures of adsorbents such as these.

The block polymers and preparations thereof are highly effective defoamers for foam-generating systems, and are suitable for numerous applications, particularly in the food industry and in chemical process engineering. Examples of such applications include the sugar industry for defoaming of molasses, the fermentation industry for defoaming of yeast and enzyme solutions, the starch industry in the production of potato starch, and also in the production of phosphoric acid from mineral phosphates. Other applications include industrial cleaning preparations and cleaning processes, particularly in the spray cleaning and washing of bottles, and as low-foam wetting agents or defoamers in polymerization reactions.

The particular value of the block polymers according to the invention is that, in use, they retain their foam-inhibiting effect for long periods. In numerous industrial processes, the treatment solutions are exposed for prolonged periods to intensive mechanical stressing and to elevated temperatures, for example, in evaporation processes involving vigorous recirculation of the solution. Although there are many known foam inhibitors which, in cases such as these, bring about spontaneous collapse of the foam, their foam-inhibiting effect soon weakens and foam builds up again. Other products destroy the foam relatively slowly, but bring about long-lasting foam inhibition. The foam inhibitors according to the invention are distinguished both by a powerful spontaneous effect and also by a lasting long-term effect. They have the major advantage over numerous silicone- and paraffin-based foam inhibitors that they do not hydrophobicize the substrate.

EXAMPLE 1

Preparation of the block polymers (a) 444 g (4.8 moles) of anhydrous glycerol were mixed with 8.9 g of sodium methylate (used as a 30% solution in methanol) and, after removal of the methanol by heating in vacuo in an autoclave, are reacted for 2 hours with stirring at 180° C. with 1550 g (35.4 moles) of ethylene oxide (EO). After the pressure had fallen, the reaction mixture was stirred for 30 minutes and then cooled.

(b) 364 g (0.89 mole) of the ethoxylated glycerol containing 7.3 moles of ethylene oxide were mixed with 17.6 g KOH (30% solution in methanol) and, after removal of the methanol in vacuo in an autoclave, were reacted while stirring at 120° C. with 1630 g (28.2 moles) of propylene oxide (PO). After the pressure had fallen, the mixture was stirred for 30 minutes at 120° C. The cooled product corresponded to the composition R+7.3 EO+32 PO, i.e., glycerol containing 7.3 moles of ethylene oxide and 32 moles of propylene oxide.

(c) After addition of 12.8 g of KOH (30% solution in methanol) and removal of the methanol in vacuo in an autoclave, 564 g (0.24 mole) of the reaction product obtained in accordance with (b) were reacted while stirring at 120° C. with another 1395 g (24.1 moles) of propylene oxide. After the pressure had fallen, the mixture was stirred for 30 minutes at 120° C. 59 g (1.34 moles) of ethylene oxide were then introduced. After the pressure had fallen, the reaction mixture was stirred for 30 minutes and then cooled. The product obtained was substantially colorless and had the folowing theoretical composition:

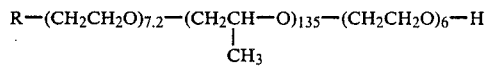

$$R-(CH_2CH_2O)_{7.2}-(CH_2CH-O)_{135}-(CH_2CH_2O)_6-H$$
$$\phantom{R-(CH_2CH_2O)_{7.2}-(}\vert$$
$$\phantom{R-(CH_2CH_2O)_{7.2}-(CH_2}CH_3$$

in which R represents the glycerol function.

The analytically determined hydroxyl number (OH No.) was 30. The deviation from the theoretical value is explained by the fact that, during the alkoxylation reaction, small amounts of the propylene oxide isomerize to allyl alcohol which then reacts with more propylene oxide to form the corresponding polypropylene glycolether. This secondary product does not affect the use of the products.

EXAMPLE II (1) Performance testing

Foam testing was carried out as follows:

A test solution is measured off and transferred to a graduated standing cylinder having a capacity of 5 liters. By means of a rotary pump, the solution is taken in at the bottom of the standing cylinder and delivered to an outlet pipe which terminates level with the upper edge of the standing cylinder. The solution falls freely back into the standing cylinder and generates foam as it impinges on the liquid surface. A constant foam height and, hence, a starting foam volume usable for the further measurement are established after a short time.

The foam inhibitor to be tested is dissolved in an inert solvent (5% by weight solution in dioxane) and, using a micropipette, is applied dropwise to the column of foam. The foam volume is measured at certain time intervals with the recirculation pump kept in operation. The presentation of these measured values in the foam of a table enables both the spontaneous foam collapse and the long-term effect of the tested foam inhibitor to be evaluated.

Inhibitors which, although bringing about spontaneous foam collapse, allow the foam to build up again after a short time may be identified in this way as unusable or unsuitable. The same applies to inhibitors which have a good long-term effect, but whose spontaneous foam destruction is only weak.

The following compounds which have already been used or described as suitable for similar purposes were tested for comparison wherein the abbreviations EO is equal to moles of added ethylene oxide, and PO is equal to moles of propylene oxide.

(A) Polyglycerol+22 PO
(B) Polypropylene glycol (MW=2020)
(C) Pluronic L61 ®
(D) Oleic acid+1 PO
(E) Tall oil fatty acid+3 EO
(F) Castor oil+11 EO
(G) Technical oleyl alcohol+2 EO
(H) Distillation residue from oxoalcohol synthesis+7% EO+27% PO
(I) Trimethylol propane+22 PO.

The commercial defoamer Pluronic L61 is a block polymer of 10% EO and 90% PO synthesized according to the sequence EO-PO-EO (molecular weight approx. 2000).

The following test solutions were used:
(a) 100 g of potato pulp prepared by ultrafine grinding from raw potatoes, dispersed in 400 ml of water,
(b) 100 ml of molasses in 400 ml of water,
(c) 100 ml of sugar beet juice in 400 ml of water, and
(d) crude grade phosphoric acid.

Quantities of 0.05 ml of a solution of 5 g of defoamer in 95 g of dioxane were used, corresponding to 5 mg of defoamer per liter of test solution. The temperature of the test solutions was 25° C.

(2) Results

TABLE 1

| Foam Inhibitor | (1) Solution a, initial foam volume 1640 ml | | | | | | |
|---|---|---|---|---|---|---|---|
| | Foam volume in ml after minutes | | | | | | |
| | 0.5 | 1 | 2 | 5 | 10 | 20 | 30 |
| Example 1 | 800 | 660 | 600 | 600 | 660 | 860 | 960 |
| A | 980 | 820 | 760 | 760 | 900 | 1260 | 1520 |
| B | 820 | 700 | 660 | 680 | 760 | 900 | 1040 |
| C | 1420 | 1440 | 1500 | 1660 | — | — | — |
| D | 1500 | 1300 | 1140 | 1140 | 1200 | 1240 | 1320 |
| E | 1200 | 1180 | 1160 | 1220 | 1420 | 1420 | 1440 |
| F | 860 | 700 | 620 | 640 | 680 | 840 | 1040 |
| G | 1120 | 960 | 800 | 780 | 940 | 1340 | 1500 |
| H | 900 | 780 | 700 | 700 | 760 | 900 | 1140 |

The inhibitor according to the invention (Example 1) is superior to the comparison products in all ranges.

TABLE 2

| Foam Inhibitor | (2) Solution b, initial foam value 2000 ml | | | | | | |
|---|---|---|---|---|---|---|---|
| | Foam volume in ml after minutes | | | | | | |
| | 0.5 | 1 | 2 | 5 | 10 | 20 | 30 |
| Example 1 | 760 | 660 | 640 | 680 | 800 | 920 | 1040 |
| A | 660 | 640 | 660 | 780 | 940 | 1340 | 1720 |
| B | 760 | 640 | 640 | 700 | 800 | 1120 | 1650 |
| C | 1000 | 860 | 920 | 1680 | 2000 | — | — |
| D | 1200 | 740 | 680 | 680 | 800 | 900 | 1020 |
| E | 1760 | 1460 | 1160 | 720 | 740 | 880 | 960 |
| H | 1000 | 800 | 720 | 740 | 840 | 980 | 1120 |
| I | 760 | 760 | 880 | 1680 | 2000 | — | — |

A number of the comparison inhibitors, namely A, B and I, act spontaneously, but have an inadequate long-term effect. Although comparison inhibitors, D, E and H are still active after a prolonged period, their spontaneous foam destruction is too weak. Inhibitor C is largely ineffective. The inhibitor according to the invention (Example 1) shows a good balance between spontaneous and long term activity.

TABLE 3

| Foam Inhibitor | (3) Solution c, initial foam value 1700 ml | | | | | | |
|---|---|---|---|---|---|---|---|
| | Foam volume in ml after minutes | | | | | | |
| | 0.5 | 1 | 2 | 5 | 10 | 20 | 30 |
| Example 1 | 960 | 760 | 580 | 580 | 640 | 740 | 960 |
| B | 1200 | 1160 | 1180 | 1480 | 1600 | 1700 | — |

The other comparison inhibitors were even less suitable than comparison inhibitor B.

TABLE 4

| Foam Inhibitor | (4) Solution d, initial foam volume 1000 ml | | | | | | |
|---|---|---|---|---|---|---|---|
| | Foam Volume in ml after minutes | | | | | | |
| | 0.5 | 1 | 2 | 5 | 10 | 20 | 30 |
| Example 1 | 220 | 220 | 240 | 250 | 250 | 280 | 290 |
| A | 250 | 270 | 270 | 310 | 460 | 730 | 980 |
| B | 220 | 240 | 250 | 260 | 260 | 480 | 740 |
| E | 240 | 240 | 250 | 250 | 260 | 280 | 310 |

This comparison also demonstrates the superiority of the inhibitor of the invention according to Example 1.

We claim:

1. A block polymer corresponding to the following formula

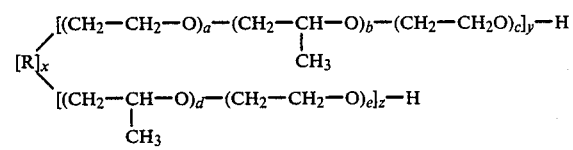

in which R represents a glycerol or polyglycerol function having a degree of polymerization x of from 1 to 6 and the indices y is equal to $(x-z+2)$, z is equal to $(x-y+2)$, a is equal to 1 to 15, b is equal to 50 to 250, c is equal to 1 to 15, d is equal to 50 to 250 and e is equal to 1 to 15, with the proviso that the sums $(a+c+e)$ is equal to 2 to 20, $(b+d)$ is equal to 50 to 250 and $(c+e)$ is equal to 1 to 15, and y has a value of at least 1, said polymer having been prepared by reacting said glycerol or polyglycerol with from 1 to 15 moles of ethylene oxide, reacting the reaction product thereof with from 50 to 250 moles of propylene oxide, and then reacting the reaction product thereof with from 1 to 15 moles of ethylene oxide wherein the total quantity of ethylene oxide used in the process amounts to between about 2 and about 20 moles of ethylene oxide, and wherein said polymer is prepared under pressure and at a temperature of between about 80° C. and about 200° C.

2. A block polymer in accordance with claim 1, wherein the indices y is equal to at least 2, a is equal to 2 to 10, b and d is equal to 80 to 200, c and e is equal to 2 to 10 and the sum $(a+c+e)$ is equal to 3 to 15.

3. A block polymer in accordance with claim 1 wherein R represents a glycerol function, x is equal to 1, y is equal to 2 or 3, and z is equal to 0 or 1.

4. An alkylene oxide block polymer useful as a defoaming agent corresponding to the following formula

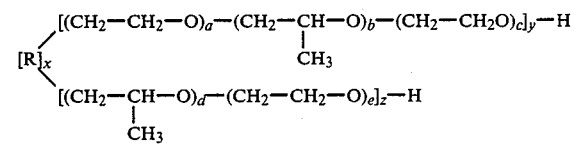

in which R represents a glycerol or polyglycerol function having a degree of polymerization x of from 1 to 6 and the indices y is equal to (x−z+2), z is equal to (x−y+2), a is equal to 1 to 15, b is equal to 50 to 250, c is equal to 1 to 15, d is equal to 50 to 250 and e is equal to 1 to 15, with the proviso that the sums (a+c+e) is equal to 2 to 20, (b+d) is equal to 50 to 250 and (c+e) is equal to 1 to 15, and y has a value of at least 1, said polymer having been prepared by reacting said glycerol or polyglycerol with from 1 to 15 moles of ethylene oxide, reacting the reaction product thereof with from 50 to 250 moles of propylene oxide, and then reacting the reaction product thereof with from 1 to 15 moles of ethylene oxide wherein the total quantity of ethylene oxide used in the process amounts to between about 2 and about 20 moles of ethylene oxide, and wherein said polymer is prepared under pressure and at a temperature of between about 80° C. and about 200° C.

5. An alkylene oxide block polymer in accordance with claim 4 wherein the indices y is equal to at least 2, a is equal to 2 to 10, b and d is equal to 80 to 200, c and e is equal to 2 to 10 and the sum (a+c+e) is equal to 3 to 15.

6. An alkylene oxide block polymer in accordance with claim 4 wherein R represents a glycerol function, x is equal to 1, y is equal to 2 or 3, and z is equal to 0 or 1.

7. A process for preparing an alkylene oxide block polymer useful as a defoaming agent corresponding to the following formula

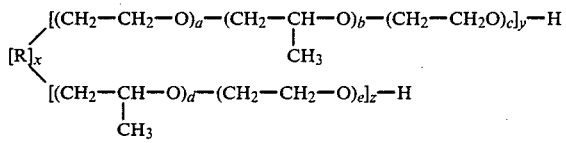

in which R represents a glycerol or polyglycerol function having a degree of polymerization x of from 1 to 6 and the indices y is equal to (x−z+2), z is equal to (x−y+2), a is equal to 1 to 15, b is equal to 50 to 250, c is equal to 1 to 15, d is equal to 50 to 250 and e is equal to 1 to 15, with the proviso that the sums (a+c+e) is equal to 2 to 20, (b+d) is equal to 50 to 250 and (c+e) is equal to 1 to 15, and y has a value of at least 1, said process comprising (1) reacting said glycerol or polyglycerol with from 1 to 15 moles of ethylene oxide, (2) reacting the reaction product of step (1) with from 50 to 250 moles of propylene oxide, and (3) reacting the reaction product of step (2) with from 1 to 15 moles of ethylene oxide, wherein the total quantity of ethylene oxide used in the process amounts to between about 2 and about 20 moles of ethylene oxide, and said process is carried out under pressure and at a temperature of between about 80° C. and about 200° C.

8. A process in accordance with claim 7 wherein from 2 to 10 moles of ethylene oxide is employed in step (1).

9. A process in accordance with claim 7 wherein from 80 to 200 moles of propylene oxide is employed in step (2).

10. A process in accordance with claim 7 wherein from 2 to 10 moles of ethylene oxide is employed in step (3).

11. A process in accordance with claim 7 wherein said process is carried out under pressure and at a temperature of between about 100° C. and about 180° C.

12. A process in accordance with claim 7 wherein said process is carried out in the presence of an acidic catalyst.

13. A process in accordance with claim 7 wherein said process is carried out in the presence of an alkaline catalyst.

14. A process in accordance with claim 13 wherein said alkaline catalyst is present in an amount of from 0.05 to 3% by weight, based on the weight of said block polymer.

* * * * *